(12) United States Patent
Zilberman et al.

(10) Patent No.: US 6,508,714 B1
(45) Date of Patent: Jan. 21, 2003

(54) SPLIT SPOOL TYPE FLEXIBLE COUPLING

(75) Inventors: Jossef Zilberman, Randallstown, MD (US); Robert E. Munyon, Pasadena, MD (US); William R. Meier, Catonsville, MD (US)

(73) Assignee: Kop Flex, Inc., Baltimore, MD (US)

( * ) Notice: Subject to any disclaimer, the term of this patent is extended or adjusted under 35 U.S.C. 154(b) by 0 days.

(21) Appl. No.: 09/696,004

(22) Filed: Oct. 26, 2000

Related U.S. Application Data
(60) Provisional application No. 60/162,980, filed on Nov. 1, 1999.

(51) Int. Cl.[7] .................................................. F16D 3/74
(52) U.S. Cl. ........................................ 464/91; 464/153
(58) Field of Search ............................... 464/69, 88, 89, 464/91, 92, 99, 153

(56) References Cited

U.S. PATENT DOCUMENTS

| | | | |
|---|---|---|---|
| 3,524,332 A | | 8/1970 | Callies |
| 3,760,909 A | * | 9/1973 | Grove .......................... 188/138 |
| 4,044,571 A | * | 8/1977 | Wildhaber .................... 464/91 |
| 4,096,711 A | * | 6/1978 | Carlson et al. ............... 464/99 |
| 4,411,634 A | | 10/1983 | Hammelmann |
| 5,670,043 A | * | 9/1997 | Lee |
| 5,899,813 A | * | 5/1999 | Bunce .......................... 464/99 |
| 5,944,611 A | | 8/1999 | McCullough |

FOREIGN PATENT DOCUMENTS

| | | | | |
|---|---|---|---|---|
| DE | 75332 | * | 1/1919 | ................... 464/91 |
| DE | 3 346 313 A | | 7/1985 | |
| DE | 3 518 923 A | | 11/1986 | |
| DE | 3 716 941 A | | 11/1987 | |
| FR | 984089 | * | 7/1951 | ................... 464/91 |
| SU | 1746082 | * | 7/1992 | ................... 464/99 |
| WO | 92/01873 | * | 2/1992 | ................... 464/99 |

* cited by examiner

*Primary Examiner*—Greg Binda
(74) *Attorney, Agent, or Firm*—W. Warren Taltavull; Manelli, Denison & Selter PLLC

(57) ABSTRACT

A coupling between a drive and a driven shaft includes a rigid tube to which are attached in axially spaced apart relation at least two flexible rings of elastomeric material; the outer periphery of each ring is attached to a flange of a connecting hub with each hub mounted or connected to one the shafts; in one form the tube is split axially and is adjustably attachable to the periphery of the rings.

6 Claims, 4 Drawing Sheets

SPLIT SPOOL TYPE FLEXIBLE COUPLING

This application is based on provisional Application Ser. No. 60/162,980 filed Nov. 1, 1999.

FIELD OF THE INVENTION

The present invention relates to flexible coupling devices for shafts to permit and facilitate transmission of torque between a drive and a driven shaft while accommodating misalignment between the shafts. More particularly, the present invention relates to a spool type flexible coupling where the spool may be split so as to enable the coupling to be established between the respective shafts with a greater degree of accommodation of distance variation between the shafts to be coupled and particularly where the shafts' ends are closely spaced and cannot be readily moved.

BACKGROUND OF THE INVENTION

In the field of flexible couplings, a number of considerations affecting the design of a flexible coupling exist. Among these are the degree of misalignment tolerated, the anticipated torque loads and design constraints relating to the installation allowed. In a number of flexible couplings of the prior art, installation of the coupling has been difficult due to the substantially static character of the coupling members. In other arrangements, only a limited type of elastomeric material could be employed in a coupling to accommodate the torque loads desired. In still other arrangements, the cost of the coupling has been increased, as a result of the complicated design of the flexible elements of the coupling such as is often required in pre-existing power shaft installations. In order to provide simplified structures for the flexible elements of the coupling, the prior art has often relied upon a variation in another portion of the installed coupling elements. This has often resulted in increased weight of the coupling which is undesirable in terms of the efficient transfer of torque from a power source to a driven member.

Where the connection flanges of the shafts to be coupled are a significant distance apart, assembly is in general much easier to accomplish than where the shafts are close together. Accordingly, where adequate spacing was provided, the prior art has generally resorted to the use of metal coupling elements in order to reliably transmit torque over a range of operating speeds and loads. In general, elastomeric materials have been avoided and this has complicated the installation procedure as well as increased the cost of such couplings. For closely spaced shafts, however, the use of elastomeric elements has become a necessity due to the confined space available to install and operate the coupling.

SUMMARY OF THE INVENTION

The present invention avoids the complications of the prior art devices yet provides a flexible coupling, which, in its basic form, accommodates a much broader range of distances between the shafts to be coupled from relatively distant to very closely located shafts yet reliably transmits torque over a satisfactory range and through an increased degree of tolerance for misalignment.

In one form of the invention, the coupling spool is split longitudinally and reinforced during assembly by a rigid ring which may be bolted in place during installation. The rigid ring will serve as reinforcement for the split spool and will facilitate installation in positions that would be otherwise difficult or expensive to attempt. In addition, a flexible elastomeric ring may is employed as the flexing member of the coupling and may also be split or formed in arcuate sections and installed on the respective halves of the split spool prior to installation in the coupling. This will also facilitate assembly with closely spaced shafts.

In another form, the present invention provides a coupling spool on which are initially movably mounted two coupling sleeves at opposite ends thereof. Each coupling sleeve is provided with a flexible diaphragm in the form of an elastomeric ring which can be coupled directly to a flange of a coupling hub which in turn is mounted on a drive or a driven shaft. The flexible rings are spaced apart a distance that is typically more substantial than in the prior art arrangements. Minor manufacturing changes will enable the coupling of this form of the present invention to accommodate a broad range of distances between the shafts to be coupled. The material of the coupling spool and associated sleeves will be such that these members can be readily adhered together by adhesive binding, riveting or the like. As noted above, the flexible rings carried by the coupling sleeves are preferably made from a flexible elastomeric material that is shaped to accommodate the degree of flexibility needed for a particular application without experiencing sheer stresses or tearing of this material in normal use. With the flexible ring preferably manufactured in an annular shape, a taper is provided where the ring narrows as one moves radially outwardly from the inner periphery of the ring to adjacent the outer rim which is narrower in axial extent. The ring is made by either compression or injection molding to achieve the desired cross-sectional shapes.

With the flexible couplings of the present invention, a user a will be able to transmit high torque loads while accommodating high degrees of misalignment. Further, the coupling is characterized by ease of installation in either narrow or extended spaces between the shafts and by a low number of individual parts for assembly. With even widely spaced apart shafts, the flexible coupling of this invention will provide high-speed capability due to the high radial rigidity of the flexible elements.

The foregoing and other advantages will become apparent as consideration is given to the following detailed description taken in conjunction with the accompanying drawings, in which:

DETAILED DESCRIPTION OF THE INVENTION

Figure 2:
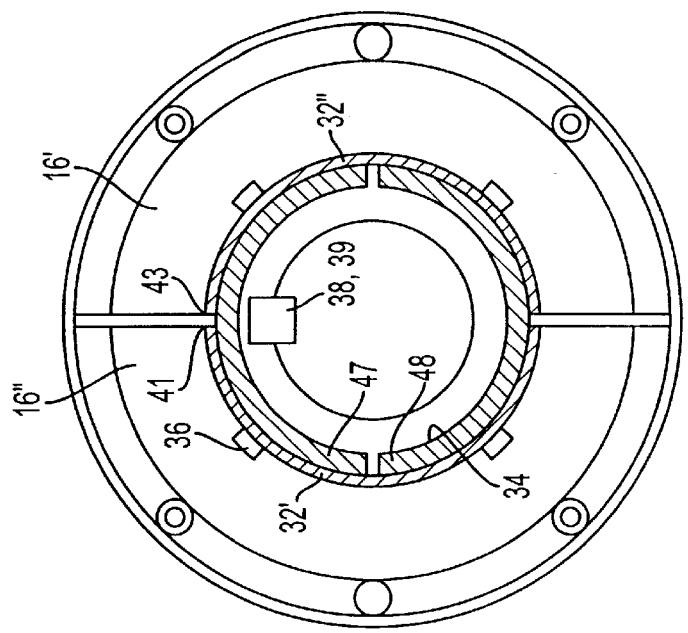
FIG. 2 is a view along lines 2—2 of FIG. 1.
Figure 1:
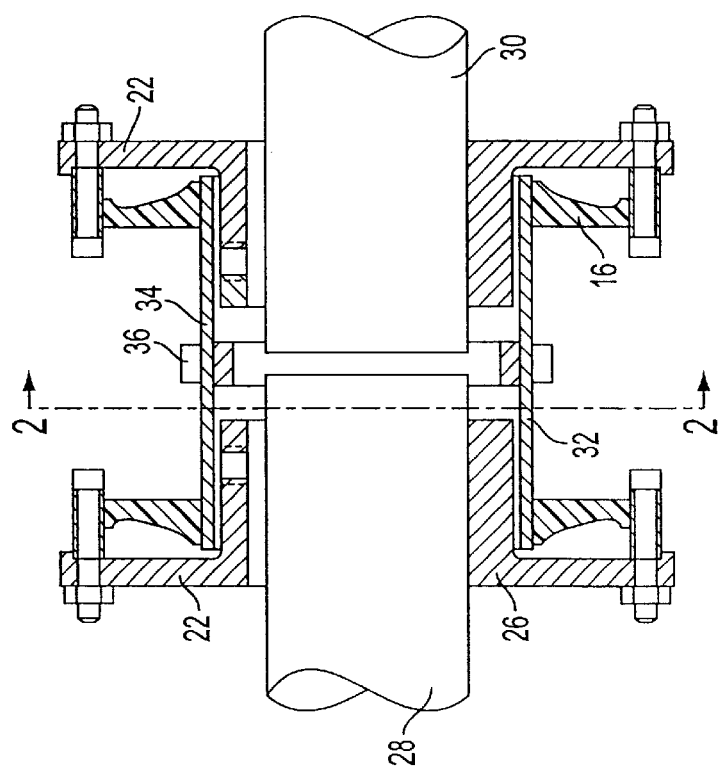
FIG. 1 is a side view in elevation of one embodiment showing an arrangement of the elements of the present invention using a split spool.

Referring to the drawings, in FIGS. 1 and 2, there is shown an embodiment of the present invention which is adapted for close-coupled shafts, that is, shafts the ends of which are in close proximity to one another and which cannot be moved away from each other than at an unacceptable cost. In this arrangement, the spool is in the form of a split tube 32 which is reinforced by an inner ring 34 and which is held in place by bolts such as at 36 which are evenly spaced about the periphery of the split tube 32. The ring 34 is preferably located at the midpoint of the tube 32 as shown in FIG. 1. The ring 34 may be provided in two halves, with two bolts provided to retain each half of the ring 34 in place against the inner surface but bridging over the edges as at 41, 43 of the tube halves which it is reinforcing. As shown in the sectional view of FIG. 2, the tube 32 is split longitudinally along its entire length to provide two semi cylindrical bodies 32' and 32". Similarly, the flexible elastomeric rings 16 may each be split into two parts 16' and 16". The radially inner peripheral edges of the ring parts 16' and 16" will each be easily secured to the radially outer peripheral surface of the split tubes 32' and 32". According to this embodiment, the diameter of the split tube 32 is made large enough to accommodate the hubs 26 as shown in FIG. 1. This will allow a substantially more compact configuration for the elements when achieving coupling between two closely located shaft ends 28 and 30 and yet will provide a coupling with adequate flexibility and tolerance for axial misalignment. The radially extending flanges 22 of hubs 26 are continuous to provide adequate torque transfer through the split rings 16' and 16". The axial extent of the hubs 26 allows it to be easily secured as by welding to the outer surfaces of their respective shafts 28 and 30. The hubs 22 may be retained on the respective shafts 28, 30 by a key 38 placed in a matching groove formed on the interior surface 39 of each hub. Since the spool is provided in two parts 32' and 32", the coupling will be easily reassembled whenever it is necessary to repair or replace elements such as the flexible rings 16' and 16".

The assembly of the elements of the coupling of FIG. 1 and 2 is important to obtain the full benefit of the invention. For substantially longer coupling life, it has been found useful to offset the split edges 41, 43 of the spool halves 32' and 32" by ninety degrees to the edges 47, 48 of the split ring 34 as shown in FIG. 2.

Figure 6A:
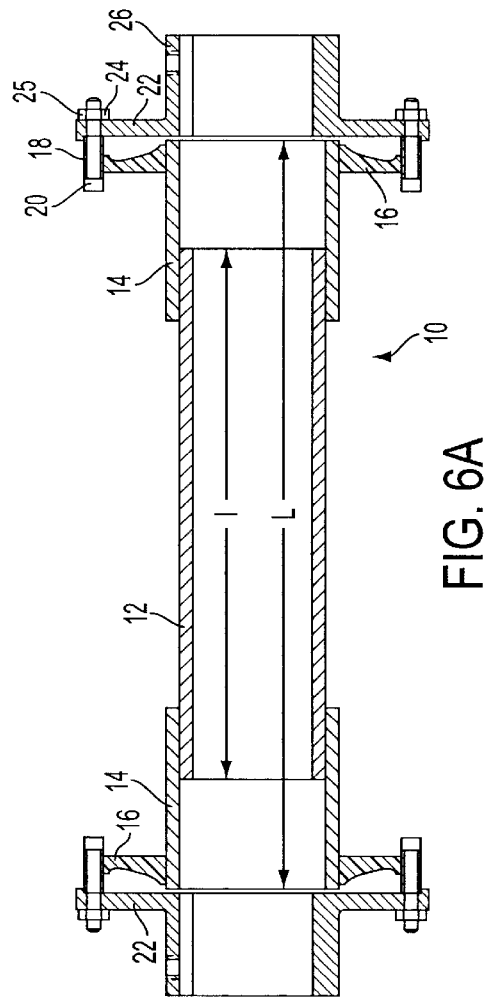
FIG. 6A is a side view in elevation of the coupling of the present invention.
Figure 6B:
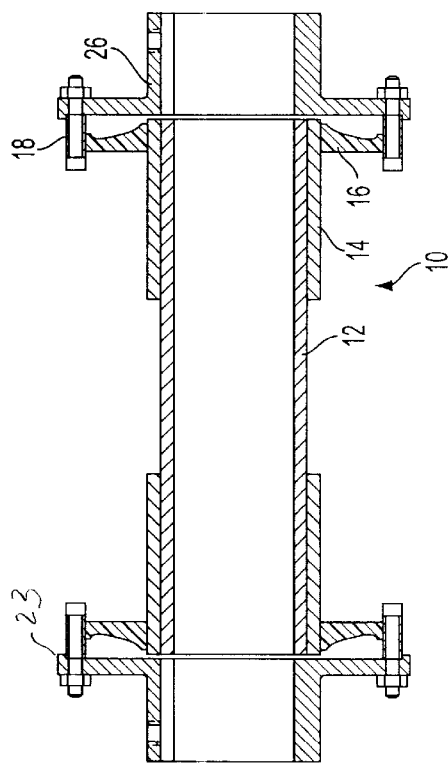
FIG. 6B is a view similar to FIG. 6A but with the telescoping feature shown in a different condition.

In FIGS. 6A and 6B, the telescoping form of the invention 10 where a spool 12 is interposed between two relatively larger diameter sleeves 14. Each of the sleeves 14 is identically configured so that a description of only the right hand sleeve will be provided.

The sleeves 14 and spool 12 are preferably made of a material such as steel or fiberglass that is easily bonded together with a conventional adhesive such as an epoxy or connected mechanically such as by rivets. Additionally, annular member 16 is readily bonded about its inner opening to the outer peripheral surface of each sleeve 14 as shown with conventionally available adhesives such as epoxies. The annular member 16 is provided equally spaced about its outer rim with bores 18 in which locking bolts 20 are located. A connection hub 26 is provided with an annular flange 22 which is provided with openings for receiving the bolts 20. Locking nuts 25 are employed to effect the attachment of the coupling flange 26 to the diaphragm 16 as shown.

The flexible coupling 10 as described above is particularly adapted to accommodate spaced apart diaphragms 16 for a wide range of distances between the coupling flanges 22. Thus, by simply selecting a spool 12 of a desired length, a user can accommodate a broad range of coupling distances between shafts. In addition, installation of the coupling 10 can be easily accomplished since the fastening of the spool 12 to one or both of the sleeves 14 can be accomplished after the elements of the coupling 10 are in place.

Figure 3:
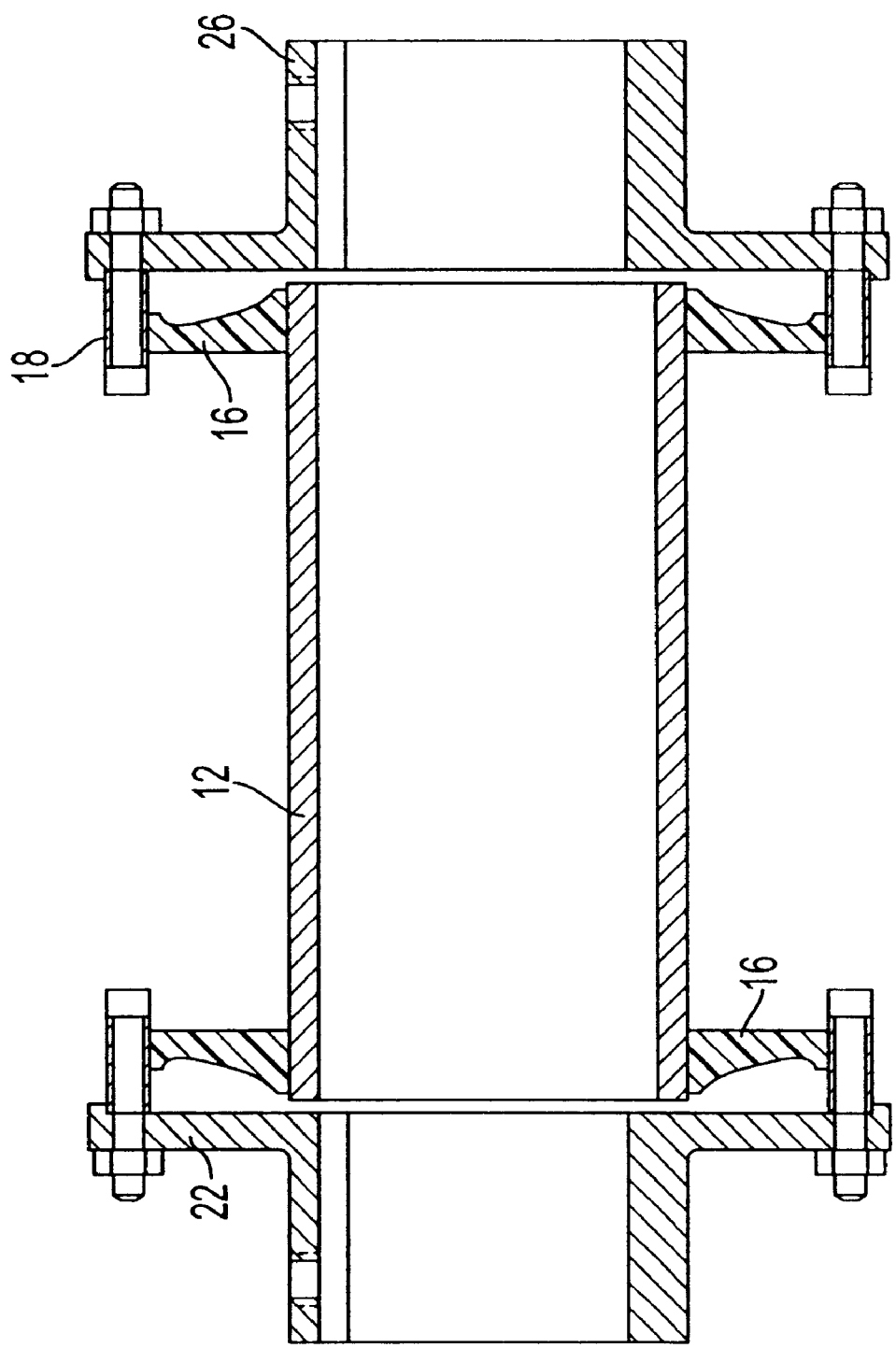
FIG. 3 is a side view in elevation of an alternate arrangement of the elements of the present invention.

As will be apparent from FIG. 3, where a telescoping facility is not used, the spool 12 may be employed alone as shown in FIG. 3 to provide a flexible coupling employing spaced apart flexible, elastomeric rings 16 which are securely bonded to the outer periphery of the spool 12 adjacent the ends of the spool 12. The use of a suitable elastomeric material such as polyurethane elastomer for the diaphragm rings 16 makes it particularly easy to install. The rings may each have cross sections that taper non linearly from their radially inner portions to their radially outer portions.

Figure 4:
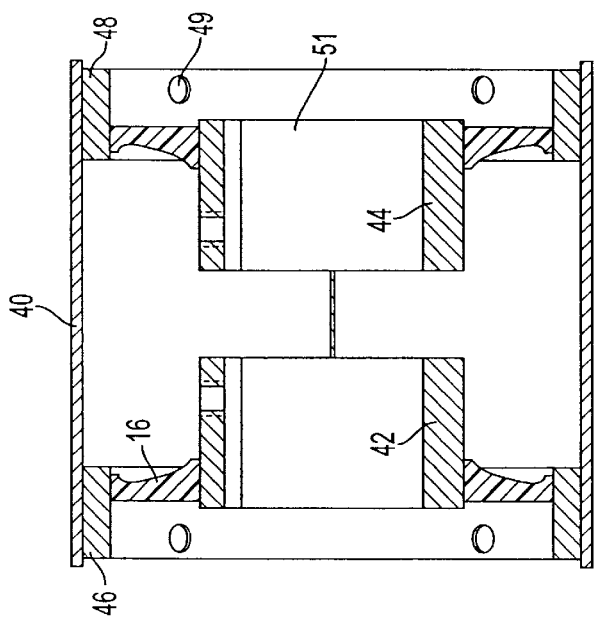
FIG. 4 is a side view in elevation of a further arrangement of the elements of the present invention.

A modification of the coupling of FIG. 1 is shown in FIG. 4 where a spool member 40 surrounds the coupling elements including two hubs or sleeves 42 and 44. The flexible, elastomeric members 16 are bonded at their interior periphery directly to the outer periphery of each of the hub members 42 and 44. The outer periphery of each of the members 16 are similarly bonded to the inner periphery of the reinforcing rings 46 and 48. The spool 40 may be either bonded or riveted as through holes 50 to the outer periphery surface of the rings 46 and 48. The shafts to be coupled will be inserted into the interior of a hub 42 to an extent to allow the second shaft to be inserted as through end 52 into hub 44. The shafts will then be fixed to their respective hubs 42, 44 by welding, bolting, riveting or the like. The spool 40 may be split parallel to its longitudinal axis to facilitate installation where the shafts are too closely placed together at the site to allow easy installation.

Figure 5:
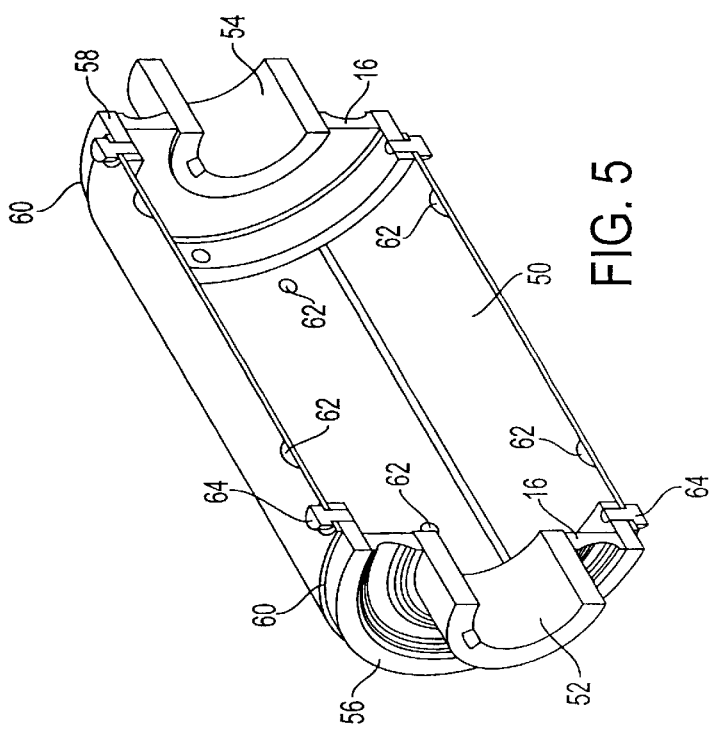
FIG. 5 is a perspective view in section of a further embodiment of the present invention.

Referring to FIG. 5, there is shown a perspective, sectional view of a further modification of the invention where a split spool 50 is employed in a configuration similar to that of FIG. 4 but with the hubs projecting externally of the ends of the spool 50. Again, the elastomeric elements 16 are bonded to the inner or periphery of reinforcing rings 56,58 and to the outer periphery of the shaft mounting hubs 52 and 54. Again, the use of a split spool facilitates installation without sacrificing the integrity of the coupling or its torque transmission ability. In addition, the rings 56,58 may be positioned at positions located axially inwardly of the outer edges 60 of the spool 50 sections by the provision of alternate fastener bores 62 located, as shown, inwardly of the edges and the outermost holes in which the screws, two of which are indicated at 64, are positioned. A plurality of sets of bores 62 may be provided to expand the range of adjustability.

The use of spaced apart flexible rings as described in the foregoing embodiments increases the misalignment tolerated by the couplings while allowing a significant latitude in installation. Moreover, the couplings described above will provide high torque transmission while retaining the advantages of lightweight installations.

What is claimed is:

1. A coupling apparatus for connecting two shafts for rotational transmission of torque between the shafts, comprising a spool, a pair of flexible rings each mounted on said spool in axially spaced apart relation, a pair of hubs with one of said pair of hubs being attachable to one shaft and the other of said pair of hubs being attachable to the other of said shafts, each hub having a flange portion and at least two connecting members on each flange portion for connecting the respective flange to one of said flexible rings, said spool being formed in two portions with each portion comprising one half of a hollow cylinder split longitudinally and a joining ring being provided to assemble the two portions for use, said joining ring engaging the surface of said spool when assembled and being attached to said surface to hold said two portions in place.

2. The coupling apparatus of claim 1 wherein said flexible rings each have an inner periphery which is attached to the surface of the said spool.

3. The coupling apparatus of claim 2 wherein said inner periphery of at least one of said flexible rings is attached to the surface of said spool by an adhesive bond.

4. The coupling apparatus of claim 1 wherein said flexible rings are each provided in two parts.

5. The coupling apparatus of claim 1 wherein said flexible rings each have an inner periphery which is attached to the surface of said spool.

6. A coupling apparatus for connecting two shafts for rotational transmission of torque between the shafts, comprising a spool having a cylindrical surface and is free of any flanges, a pair of flexible rings each having an inner surface mounted directly on said cylindrical surface of said spool in axially spaced apart relation, a pair of hubs with one of said pair of hubs being attachable to one shaft and the other of said pair of hubs being attachable to the other of said shafts, each hub having a flange portion and at least two connecting members on each flange portion for connecting the respective flange to one of said flexible rings, said flexible rings each being made from an elastomer material.

* * * * *